(12) United States Patent
Anastasi

(10) Patent No.: US 8,925,247 B1
(45) Date of Patent: Jan. 6, 2015

(54) PLANT WATERING SYSTEM

(71) Applicant: Bartholomew J. Anastasi, Fishkill, NY (US)

(72) Inventor: Bartholomew J. Anastasi, Fishkill, NY (US)

(*) Notice: Subject to any disclaimer, the term of this patent is extended or adjusted under 35 U.S.C. 154(b) by 0 days.

(21) Appl. No.: 13/787,319

(22) Filed: Mar. 6, 2013

(51) Int. Cl.
*A01G 25/00* (2006.01)
*A01G 27/00* (2006.01)

(52) U.S. Cl.
CPC .................... *A01G 27/005* (2013.01)
USPC .......................................... 47/79

(58) Field of Classification Search
CPC ...... A01G 29/00; A01G 25/00; A01K 5/0225
USPC .................................... 47/48.5, 79
See application file for complete search history.

(56) References Cited

U.S. PATENT DOCUMENTS

| | | | |
|---|---|---|---|
| 3,542,069 A * | 11/1970 | Ollison | 137/624.21 |
| 4,347,687 A * | 9/1982 | Sibbel | 47/79 |
| D285,756 S | 9/1986 | Harper | |
| 4,619,072 A | 10/1986 | Privett | |
| D381,602 S * | 7/1997 | Edwards | D11/164 |
| 5,836,106 A * | 11/1998 | Alex | 47/48.5 |
| 5,918,415 A | 7/1999 | Locke et al. | |
| 5,921,443 A * | 7/1999 | McMillan | 222/174 |
| 6,370,820 B1 | 4/2002 | Moss | |
| 6,782,844 B2 | 8/2004 | Winney | |
| 7,222,454 B1 | 5/2007 | Chen | |
| 7,441,286 B1 | 10/2008 | Taylor Parker | |
| 7,730,665 B2 * | 6/2010 | Tran | 47/66.6 |
| 8,132,362 B2 * | 3/2012 | King | 47/48.5 |
| 2002/0167166 A1* | 11/2002 | Klein et al. | 285/239 |
| 2009/0277085 A1 | 11/2009 | Stewart | |
| 2009/0293354 A1 | 12/2009 | Goldberg et al. | |

* cited by examiner

*Primary Examiner* — Isam Alsomiri
*Assistant Examiner* — Ebony Evans

(57) ABSTRACT

The present invention features a portable plant watering system. The system comprises a liquid bottle, an attaching means, a liquid bottle connector, a plurality of flexible water tubing, a plurality of T-connectors, a plurality of water outlet ports to water multiple plants. Each water outlet port is integrated with adjustment means to adjust water flow rate individually accordingly. The plant watering system can be set-up on porch or patio effortlessly thus provide a quick and cost effective solution for in-door garden water needs.

19 Claims, 4 Drawing Sheets

(Front View)

(Front View)

(Exploded View)

(ISO View)

(Detail View)

PLANT WATERING SYSTEM

FIELD OF THE INVENTION

The present invention relates plant watering system and, more particularly, to a watering system for both indoor and outdoor plant usage.

BACKGROUND OF THE INVENTION

While outdoor gardens typically have pre-installed water systems capable of water plants in a pre-defined schedule, such as time, water flow rate, etc, indoor gardens especially small patio sized are normally not such equipped due to room limitation. Some indoor plants need re-positioning on a daily basis for proper ventilation, sun shine, especially in cold areas. The plants are moved outside for sunshine in the morning, moved inside to avoid cold weather. Hence, there is a need for a portable plant watering system flexible enough for provide watering needs for both indoor and outdoor applications with minimum laboring work involved.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a portable plant watering system. The system comprises a liquid bottle, an attaching means, a liquid bottle connector, a plurality of flexible water tubing, a plurality of T-connectors, a plurality of water outlet ports to water multiple plants. Each water outlet port is integrated with adjustment means to adjust water flow rate individually accordingly. The plant watering system can be set-up on porch or patio effortlessly thus provide a quick solution for in-door garden water needs.

DESCRIPTION OF PREFERRED EMBODIMENTS

Figure 1:
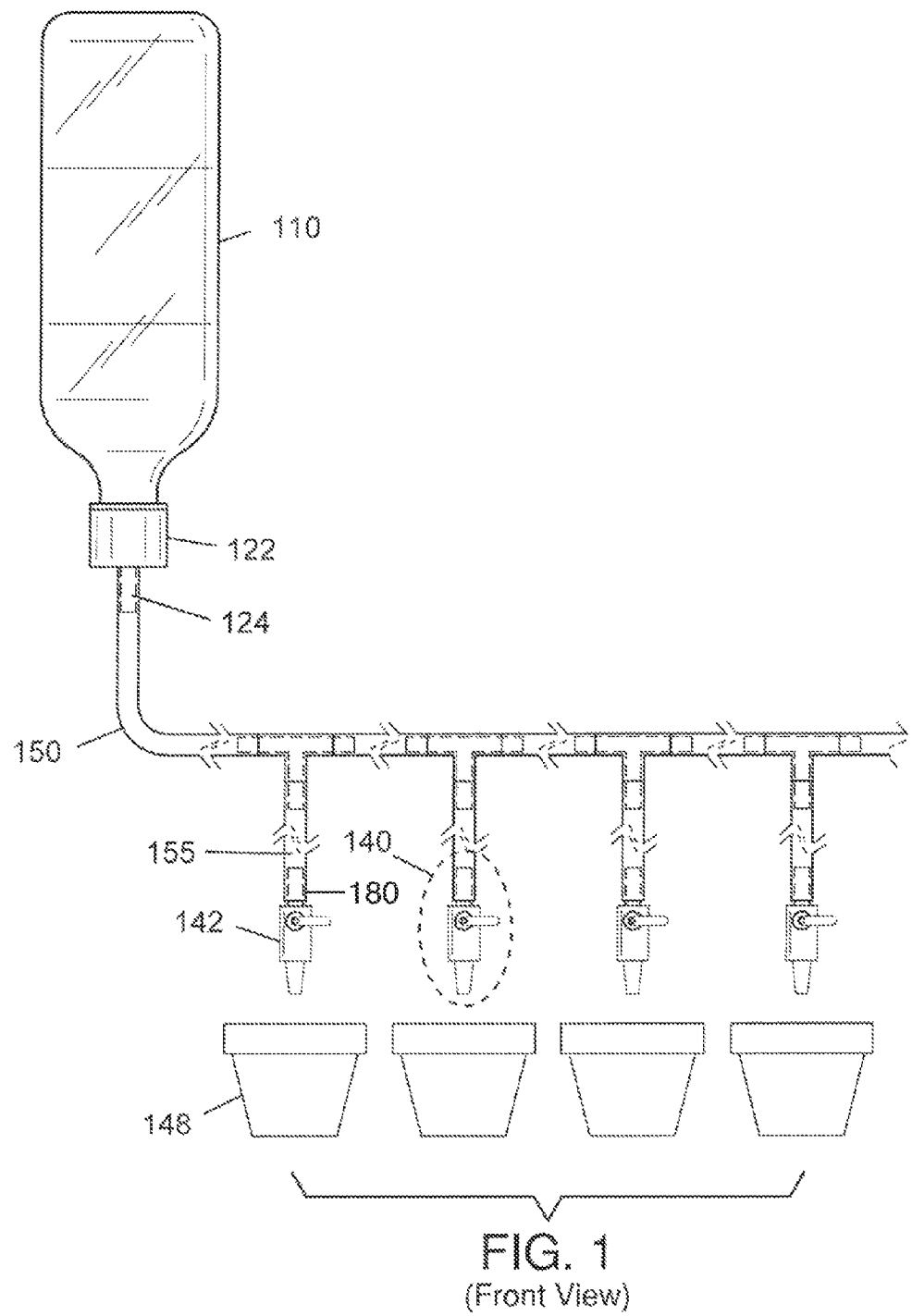
FIG. 1 shows a front view of the plant watering system.
Figure 2:
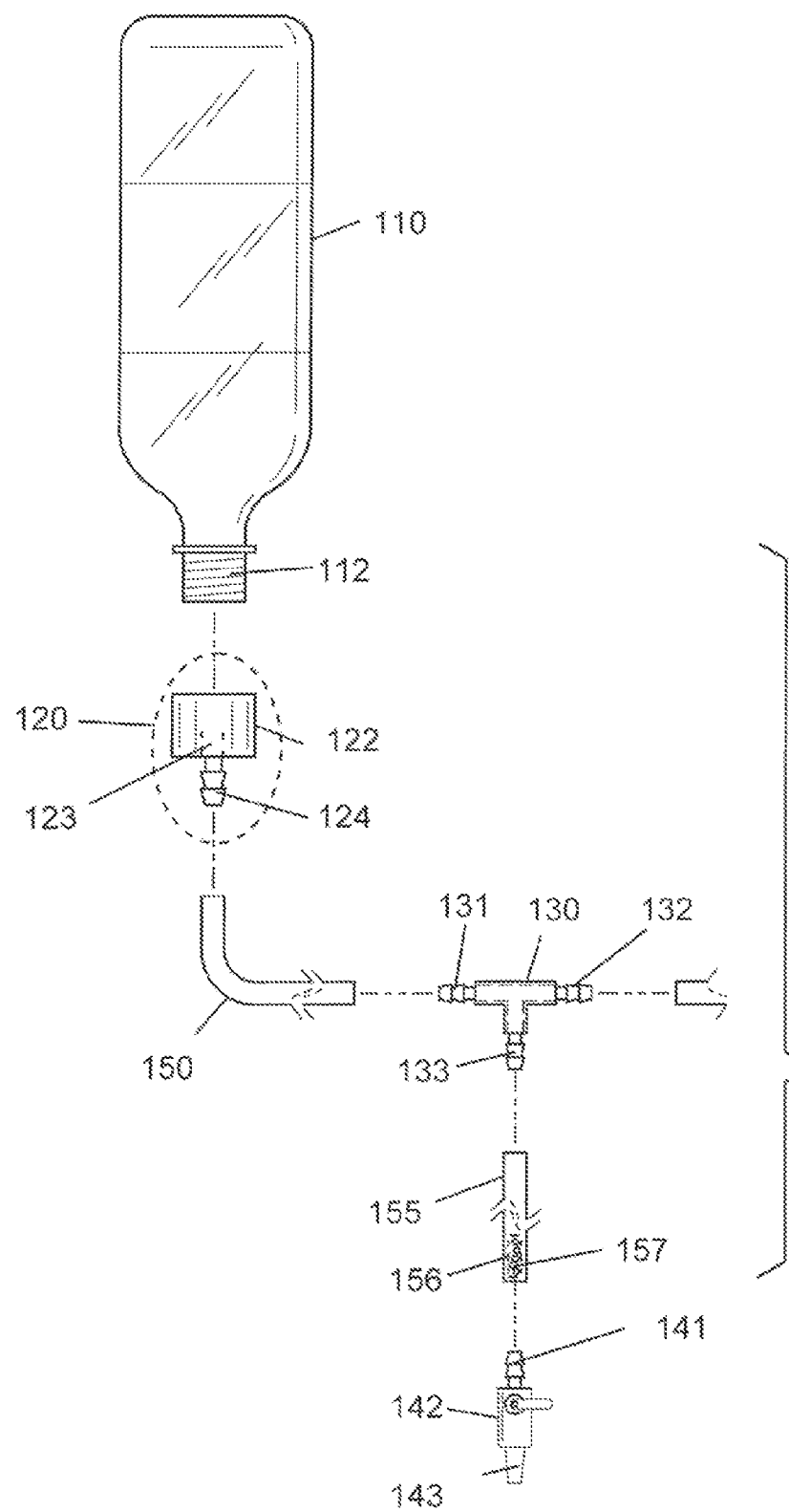
FIG. 2 shows an exploded view of the plant watering system.
Figure 3:
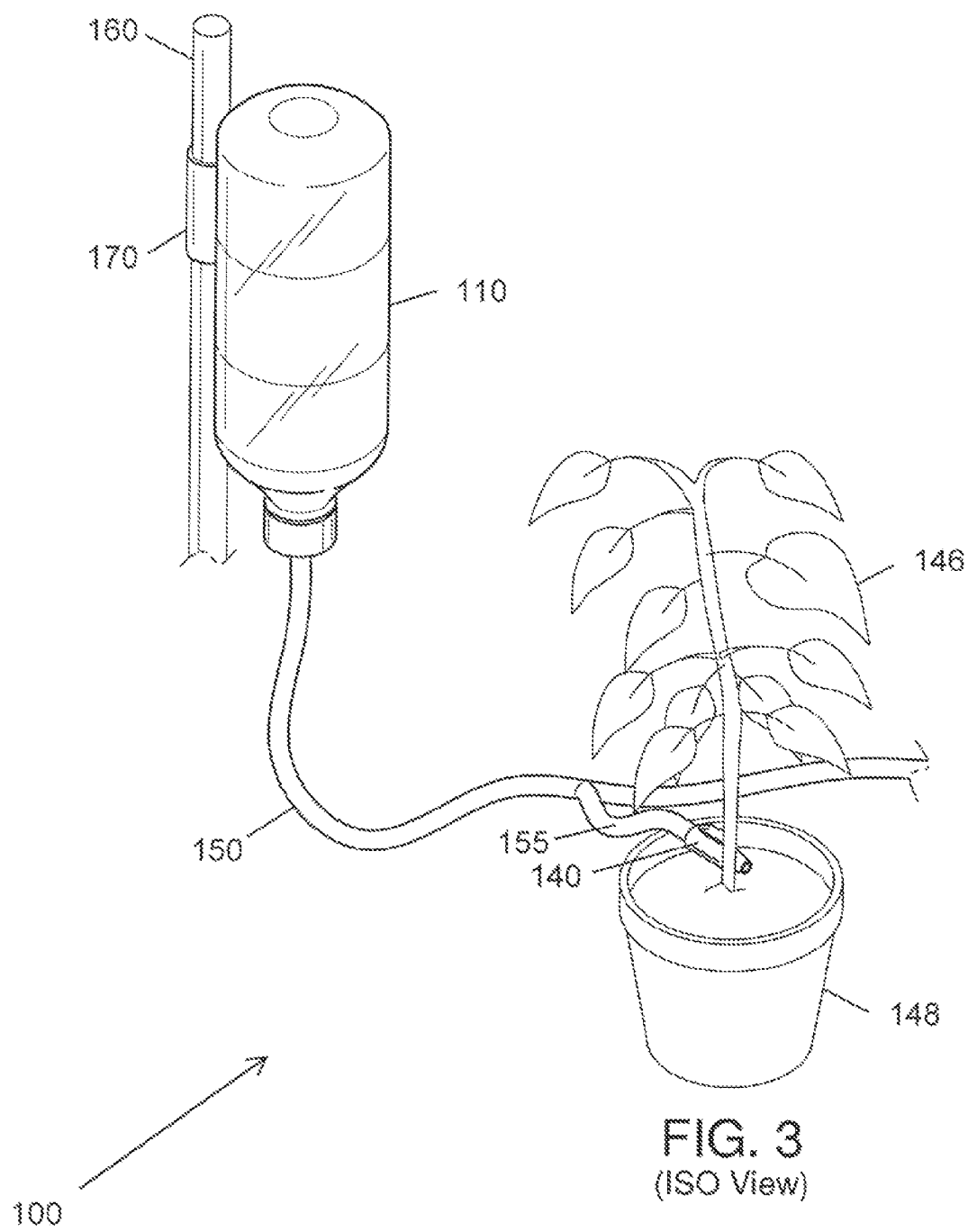
FIG. 3 shows an isometric view of the plant watering system.
Figure 4:
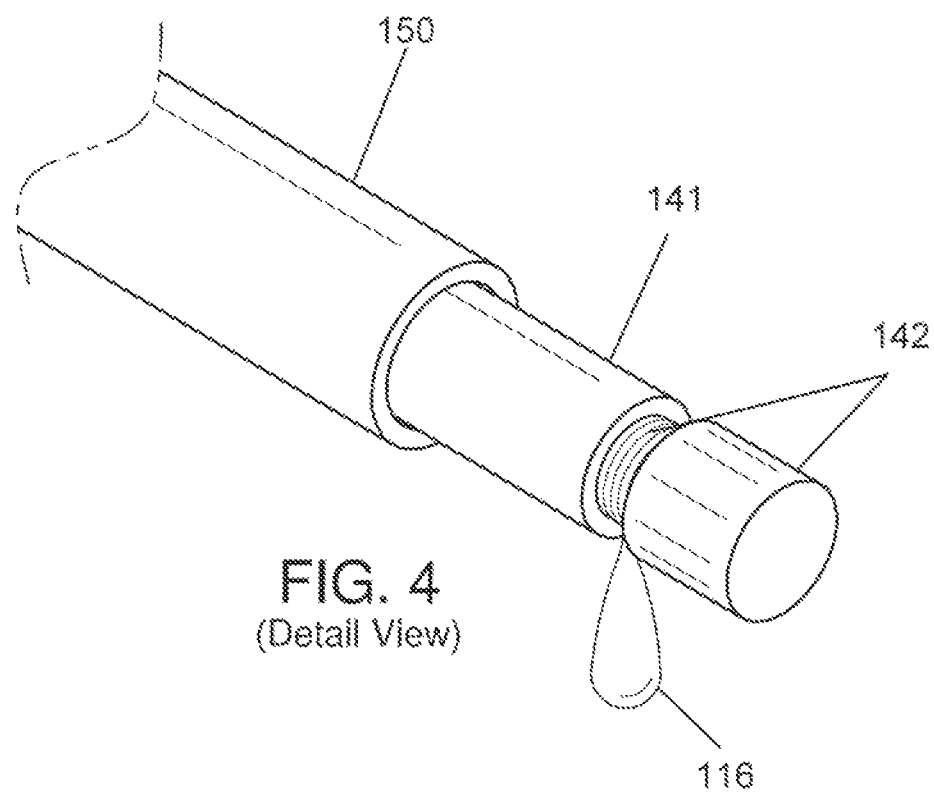
FIG. 4 shows a detailed view of adjustment means in a water outlet of the watering system.

Referring now to FIG. 1-6, the present invention features a portable plant watering system (100). The system comprises a liquid bottle (110), a liquid bottle connector (120), a plurality of T-shaped fittings (130), a plurality of liquid outlets (140), a plurality of tubing (150), a plurality of pots (148) and a plurality of plants (146) with each plant inside one pot.

The liquid bottle (110) has an opening (112), wherein a liquid (116) is filled inside and drained through the opening (112). In some embodiments, the liquid (116) is water. In some embodiments, the liquid (116) is water mixed with liquid fertilizer, solvable plant foods, pesticide, or a combination herein. In some embodiments, the liquid bottle (110) has a volume scale on side wall so that the user can monitor the total volume of the liquid to be watered into the plants. In some embodiments, the liquid bottle (110) is a standard 2-liter or a standard 1-gallon water container.

The liquid bottle connector (120) comprises a cap (122) and a tubing connector (124). In some embodiments, wherein the opening (112) of the liquid bottle (120) is threaded, wherein the cap (122) of the liquid bottle connector (120) are threaded, wherein the threads of the opening (112) and the cap (122) are matched. In some embodiments, the tubing connector (124) of the liquid bottle connector (120) is a barbed connector.

The system comprises a plurality of T-shaped fittings (130), wherein the T-shaped fitting comprises a left arm (131), a right arm (132) and a middle arm (133), wherein the left arm (131) and right arm (132) are aligned on the same line, wherein the third arm (133) is perpendicular to both the first arm (131) and second arm (132), wherein the first arm (131) is in the water flow upstream. The fittings (130) can be a variety of types, such as push-to-connect fitting, quick connect fitting, compression fitting, barbed fitting etc. The T-shape fittings are well known to one of ordinary art in the field. Preferably, the left arm (131), right arm (132) and middle arm (133) of the T-shaped fitting (130) are all barbed.

The system comprises a plurality of liquid outlets (140), wherein the water outlet has a top connector (141), an adjuster (142) and liquid release port (143), wherein the adjuster (142) regulates liquid flow rate, wherein the liquid (116) is released to irrigate plant (146) inside a pot (148). In some embodiments, the top connector (141) is a barbed connector. In some embodiments, the adjuster (142) of the liquid outlet (140) is a valve with a knob disposed outside of the valve (143), wherein the liquid flow rate is adjusted by adjusting the position of the knob. In some embodiments, the adjuster (142) of the liquid outlet (140) is a set of a threaded opening and a threaded cap, herein the liquid flow rate is adjusted by adjusting the tightness of the threaded cap over the threaded opening. Preferably, the valve with knob is used because the user can easily and quickly identify the water flow rate by viewing the adjust knob position. The knob of each liquid outlet (140) can be adjusted independently for the watering requirement of each specific plant.

A first plurality of tubings (150) are used to fluidly connect the said tubing connector (124) to the left arm (131) of the T-shaped fittings, to connect two T-shaped fittings immediately adjacent. A second plurality of tubings (155) are used to fluidly connect the third arm (133) of the T-shaped fitting (130) to the top connector (141) of the said water outlet. The adjuster (142) and the liquid release port (143) are located at a terminus (180) of the second plurality of tubing (155). The tubing (150) is made of polypropylene, Teflon, polyethylene, Polyvinyl chloride (PVC), polycarbonate or rubber. In some embodiments, the tubing (150) has a diameter ranging from ⅛ inch to 4 inches. The liquid inside the bottle (110) is flowing out via the opening (112), passing through the liquid bottle connector (120), diverted into a plurality of said T-shaped fittings (130) via a first plurality of tubings (150), irrigating the said plants (146) in each pot (148) via a second plurality of tubing (155) and liquid outlets (140).

In some embodiments, a cartridge (156) is disposed inside each of the tubing (155). The cartridge (156) is filled with solids (157) such as pesticide or plant food. The solids are soluble with water. The solids can be the same for all cartridges or alternatively, the solids are different for each cartridge such that each plant get individual irrigation solutions.

In some embodiments, the system (100) further comprises a rod holder (160) and attachment means (170) to attach the liquid bottle (110) to the holder (160). The attachment means (170) can be a strap, a rope tie, etc. The rod (160) can be easily attached to any porch or patio.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A plant watering system (100) for plant watering indoor and outdoor, the system comprising:
    (a) a liquid bottle (110) having an opening (112), wherein a liquid (116) is filled inside and drained through the opening (112);
    (b) a liquid bottle connector (120), wherein the liquid bottle connector (120) comprises a cap (122) and a tubing connector (124), wherein the cap has a hole (123) in the middle, wherein the cap is fluidly connected to the bottle opening (112);
    (c) a plurality of T-shaped fittings (130), wherein each T-shaped fitting comprises a first arm (131), a second arm (132) and a third arm (133), wherein the first arm (131) and second arm (132) are aligned on the same line, wherein the third arm (133) is perpendicular to both the first arm (131) and second arm (132);
    (d) a plurality of liquid outlets (140), wherein each liquid outlet (140) has a top connector (141), an adjuster (142) and liquid release port (143), wherein the adjuster (142) regulates liquid flow rate, wherein the liquid (116) is released to irrigate plants (146) inside pots (148);
    (e) a first plurality of tubing (150), wherein the first plurality of tubing is used to fluidly connect the tubing connector (124) to the first arm (131) of the plurality of T-shaped fittings, wherein the first plurality of tubing is used to fluidly connect two T-shaped fittings immediately adjacent;
    (f) a second plurality of tubing (155), wherein the second plurality of tubing (155) is used to fluidly connect the third arm (133) of the T-shaped fitting (130) to the top connector (141) of the liquid outlet, wherein the adjuster (142) and the liquid release port (143) are located at a terminus (180) of the second plurality of tubing (155);
    (g) a plurality of pots (148), wherein each of the second plurality of tubing hovers above a rim level of each pot to allow for water to freely drop from the second plurality of tubing into each of the pots, respectively;
    (h) a plurality of plants (146), wherein each plant is disposed inside one of the plurality of pots (148); and
    wherein the liquid inside the bottle (110) is flowing out via the opening (112), passing through the liquid bottle connector (120), diverted into the plurality of T-shaped fittings (130) via the first plurality of tubing (150), irrigating each plant (146) in each pot (148) via the second plurality of tubing (155) and liquid outlets (140).

2. The system of claim 1, wherein the opening (122) of the liquid bottle (120) is threaded, wherein the cap (122) of the liquid bottle connector (120) are threaded, wherein the threads of the opening (122) and the cap (122) are matched.

3. The system of claim 1, wherein the liquid (116) is water.

4. The system of claim 1, wherein the liquid (116) is water mixed with liquid fertilizer, solvable plant foods, pesticide, or a combination herein.

5. The system of claim 1, wherein the tubing connector (124) of the liquid bottle connector (120) is a barbed connector.

6. The system of claim 1, wherein the first arm (131), second arm (132) and third arm (133) of the T-shaped fitting (130) are all barbed.

7. The system of claim 1, wherein the first and second plurality of tubing (150) is made of polypropylene, Teflon, polyethylene, Polyvinyl chloride (PVC), polycarbonate or rubber.

8. The system of claim 1, wherein the first and second plurality of tubing (150) has a diameter ranging from ⅛ inch to 4 inches.

9. The system of claim 1, wherein the adjuster (142) of each liquid outlet (140) is adjustable independently.

10. The system of claim 1, wherein the adjuster (142) of the liquid outlet (140) is a valve with a knob disposed outside of the valve (143), wherein the liquid flow rate is adjusted by adjusting a position of the knob.

11. The system of claim 1, wherein the adjuster (142) of the liquid outlet (140) is a set of a threaded opening and a threaded cap.

12. The system of claim 1, wherein the liquid bottle (110) has a volume scale on a side wall.

13. The system of claim 1, wherein the system (100) further comprises a rod holder (160) and attachment means (170) to attach the liquid bottle (110) to the holder (160).

14. The system of claim 1, wherein a cartridge (156) is disposed inside each of the second plurality of tubing (155), wherein the cartridge (156) is filled with solids (157).

15. The system of claim 14, wherein the solids are soluble.

16. The system of claim 15, wherein the solids are pesticide or plant food.

17. The system of claim 16, wherein the solids are the same for all cartridges.

18. The system of claim 16, wherein the solids are different for each cartridge such that each plant gets individual irrigation solutions.

19. A plant watering system (100) for plant watering indoor and outdoor, the system consisting of:
    (a) a liquid bottle (110) having an opening (112), wherein a liquid (116) is filled inside and drained through the opening (112);
    (b) a liquid bottle connector (120), wherein the liquid bottle connector (120) consists of a cap (122) and a tubing connector (124), wherein the cap has a hole (123) in the middle, wherein the cap is fluidly connected to the bottle opening (112);
    (c) a plurality of T-shaped fittings (130), wherein each T-shaped fitting consists of a first arm (131), a second arm (132) and a third arm (133), wherein the first arm (131) and second arm (132) are aligned on the same line, wherein the third arm (133) is perpendicular to both the first arm (131) and second arm (132);
    (d) a plurality of liquid outlets (140), wherein each liquid outlet (140) has a top connector (141), an adjuster (142) and liquid release port (143), wherein the adjuster (142)

regulates liquid flow rate, wherein the liquid (116) is released to irrigate plants (146) inside pots (148);

(e) a first plurality of tubing (150), wherein the first plurality of tubing is used to fluidly connect the tubing connector (124) to the first arm (131) of the plurality of T-shaped fittings, wherein the first plurality of tubing is used to fluidly connect two T-shaped fittings immediately adjacent;

(f) a second plurality of tubing (155), wherein each of the second plurality of tubing (155) is used to fluidly connect the third arm (133) of the T-shaped fitting (130) to the top connector (141) of the liquid outlet, wherein the adjuster (142) and the liquid release port (143) are located at a terminus (180) of each of second plurality of tubing (155);

(g) a plurality of pots (148);

(h) a plurality of plants (146), wherein each plant is disposed inside one of the plurality of pots (148); and wherein the liquid inside the bottle (110) is flowing out via the opening (112), passing through the liquid bottle connector (120), diverted into a plurality of said T-shaped fittings (130) via the first plurality of tubing (150), irrigating each of the plants (146) in a corresponding pot (148) via the second plurality of tubing (155) and liquid outlets (140).

* * * * *